Figure 1:
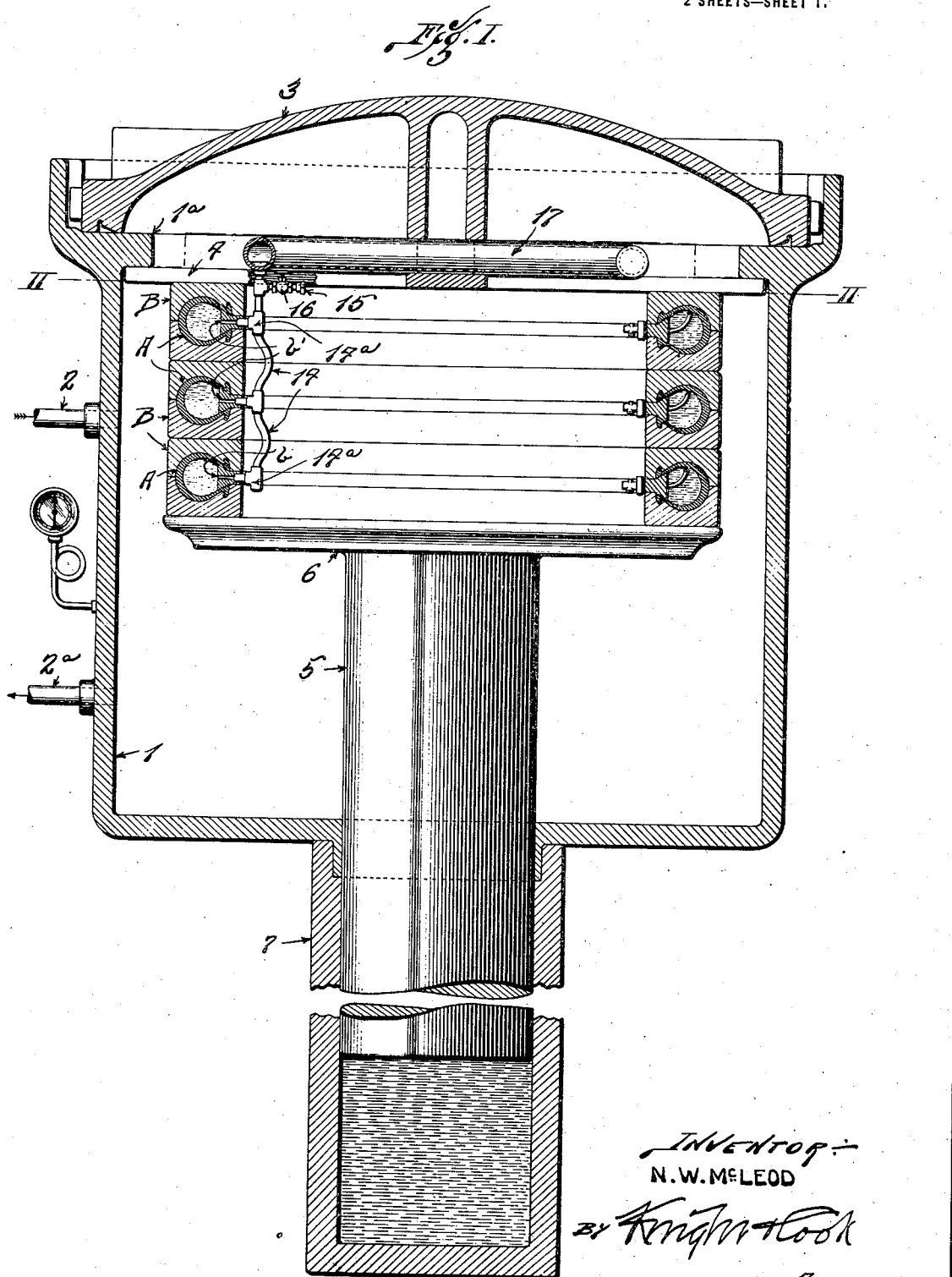

N. W. McLEOD.
APPARATUS FOR FORMING AND VULCANIZING RUBBER ARTICLES.
APPLICATION FILED MAY 4, 1916.

1,213,224.

Patented Jan. 23, 1917.
2 SHEETS—SHEET 1.

INVENTOR:
N. W. McLEOD
By Knight & Cook
Attys.

N. W. McLEOD.
APPARATUS FOR FORMING AND VULCANIZING RUBBER ARTICLES.
APPLICATION FILED MAY 4, 1916.
1,213,224.
Patented Jan. 23, 1917.
2 SHEETS—SHEET 2.
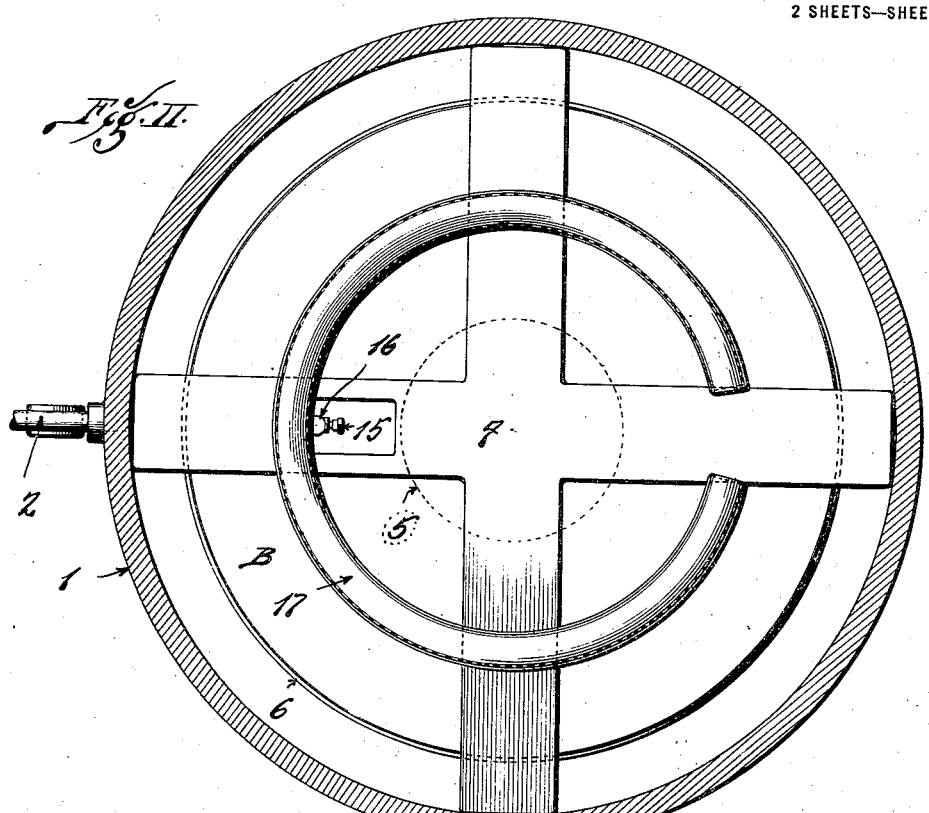
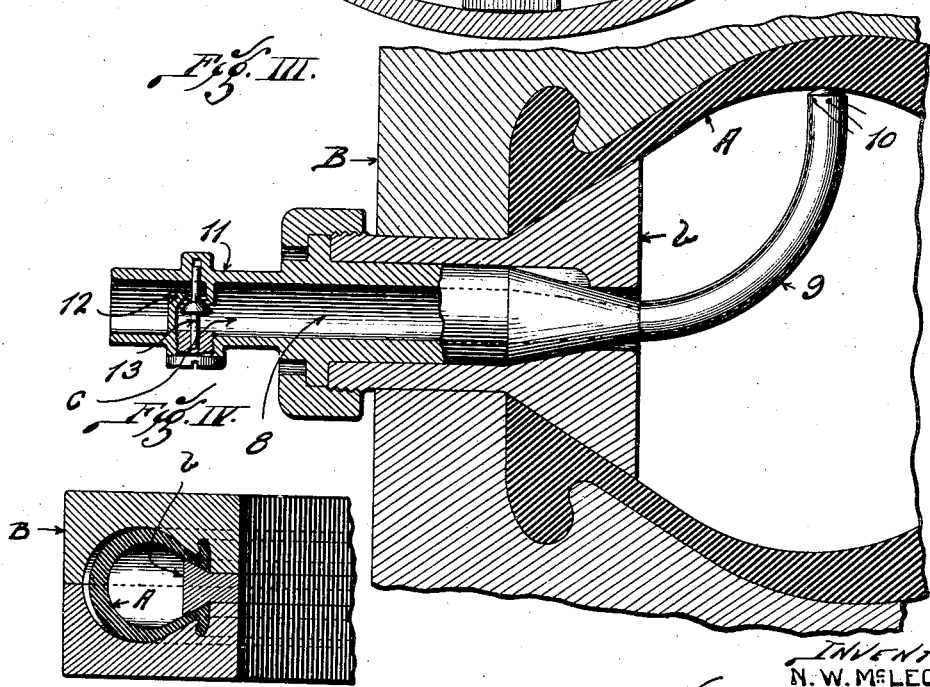
INVENTOR:
N. W. McLEOD

UNITED STATES PATENT OFFICE.

NELSON W. McLEOD, OF ST. LOUIS, MISSOURI, ASSIGNOR TO AMERICAN MOTORS TIRE COMPANY, OF DETROIT, MICHIGAN, A CORPORATION OF MICHIGAN.

APPARATUS FOR FORMING AND VULCANIZING RUBBER ARTICLES.

1,213,224.   Specification of Letters Patent.   Patented Jan. 23, 1917.

Application filed May 4, 1916. Serial No. 95,337.

*To all whom it may concern:*

Be it known that I, NELSON W. McLEOD, a citizen of the United States of America, a resident of the city of St. Louis, State of Missouri, have invented certain new and useful Improvements in Apparatus for Forming and Vulcanizing Rubber Articles, of which the following is a full, clear, and exact description, reference being had to the accompanying drawings, forming a part of this specification.

My invention relates to a vulcanizing apparatus providing for the use of internal fluid pressure within a mold and against the rubber article to be vulcanized, in order that such article may be expanded uniformly *in toto* and held at every point against the internal wall of the mold during the period of vulcanization. Vulcanizing apparatus of this kind are especially useful in vulcanizing hollow rubber tires such as pneumatic tires or casings for automobiles.

Numerous efforts have heretofore been made to provide a vulcanizing apparatus using fluid pressure for the distention of the rubber articles in the vulcanizing molds, the originators of such apparatus proposing to utilize fluid agents of various natures, for example, steam or air, or water which will be turned to steam when heated within the rubber articles. The use of fluids of these mentioned kinds is objectionable for different reasons, principally because they permeate the structure to be vulcanized, consequently the prior apparatus have not proven thoroughly satisfactory from a commercial standpoint.

The object of the present invention is to provide a vulcanizing apparatus which permits of the use of absolute hydraulic pressure against the rubber articles being vulcanized, without any liability of the water made use of for the hydraulic pressure being converted into steam, and with avoidance of the presence of air in conjunction with the hydraulic pressure medium within the rubber article being vulcanized. Water alone is the ideal substance for use as a pressure medium in an apparatus of this kind and it is a well known fact that the presence of steam or air in conjunction with water as medium to afford internal pressure within rubber articles to be vulcanized is objectionable owing to permeation thereby into the rubber articles and to the inability of transferring heat with relative uniformity through solid bodies and gaseous bodies.

Difficulty has been experienced in discovering a way of maintaining a strict hydraulic pressure within the rubber articles to be vulcanized, so that permeation would be avoided and the conductivity of the internal fluid pressure medium would be constantly uniform at all points.

My present invention consists in a construction whereby I eliminate air from the interior of the rubber article to be vulcanized and afford no opportunity for the generation of steam within the rubber articles as will hereinafter appear.

Figure I is a vertical section through my vulcanizing apparatus. Fig. II is a horizontal section taken on line II—II, Fig. I. Fig. III is a enlarged cross section through one of the molds and the air vent device mounted therein. Fig. IV is an enlarged cross section through one of the molds, showing an unvulcanized tire therein as it appears prior to the introduction of hydraulic pressure into the tire.

In the drawings, I have illustrated my apparatus of preferred construction, with the article to be treated shown as rubber tires, designated A, the tires having two edges at their inner circles and being built up of fabric and rubber compound, in accordance with the usual practice in making hollow tires of the pneumatic tire type. The tires A are incased within suitable sectional molds B, each mold including, in addition to shell sections, an abutment ring *b*, which is situated between the edges at the inner circle of the tire when the built up raw tire is placed within the mold, to remain in such position throughout the treatment of the tire. The abutment ring, by its position between the edges of the tire, permits of the tire edges being tightly clamped between said abutment ring and the shell sections of the mold to produce fluid tight joints, in order that water introduced into the tire occupying the mold cavity, may be retained therein for the treatment of the tire.

1 designates a vulcanizer pot, through which steam is circulated, the pot, with this object in view, having connected to it pipes 2 and 2ª, one of which serves to admit live steam to the pot and the other of which allows the steam to escape from the pot. The vulcanizer pot has a closure 3, which may be held in closed position by any suitable means, access to the pot being permitted by moving, either the body of the pot or the closure relative to the other part of the pot. The vulcanizer pot is arranged to receive an abutment spider 4 beneath which the molds B are confined as will be presently pointed out. This abutment spider is preferably in the form of a cross and portions of it are positioned beneath lugs 1ª extending inwardly from the wall of the vulcanizer pot at its upper end.

5 designates a mold moving means in the form of a hydraulic ram provided with a head or table 6, the latter being situated within the vulcanizer pot and being movable therein. The ram head 6 serves as a support for the molds B, and upon the movement of the ram and its head toward the opposing abutment spider 4 inserted after the molds have been put in place, the pressure exerted upon the sectional molds B causes the tires therein to be clamped within the molds between the mold sections and the abutment ring $b$ to such degree as to render the joints of the mold fluid tight. Steam admitted into the vulcanizer pot is, therefore, excluded from the molds, except through means to be hereinafter described. The hydraulic ram 5 is operable in a cylinder 7, into which water or other fluid is introduced.

I next come to a description of the means by which fluids are conducted into the molds B, for the purpose of first fully expanding and compressing raw tires in said molds and, thereafter, vulcanizing the interior portions of the tires, while the exterior portions of the tires are being vulcanized from heat transmitted through the mold shells. It will, however, facilitate the description to first describe an automatic valve device C, by which communication is established between the interiors of each mold and the vulcanizer pot to vent air from the tire within the mold prior to the delivery of water thereinto. This valve device C comprises a tube 8 which extends through the abutment ring $b$ of the mold, the said tube being provided at its inner end with a pipe 9 extending upwardly therefrom in the mold cavity so that its upper end terminates in proximity to the inner face of the tire A, the pipe 9 having in its wall, near its upper end, apertures 10 which provide for the entrance of air from the interior pipe into the tire at the greatest elevation therein. At the outer end of the tube 8 is a valve casing 11, containing a valve chamber 13 in which is a valve seat 12 and an air relief valve movable to and from said seat.

The abutment rings $b$ of the molds B used in my vulcanizing apparatus contains a duct $b'$ through which water may be introduced into the tire A within the mold.

14 designates a water conducting pipe provided with as many connections 14ª as there are molds, said connections being of such construction as to permit of the ready application of the connections to the abutment rings of the molds at the ducts $b'$. Water is delivered to the water conducting pipe 14 from a hose or other pipe (not shown) which may be detachably connected to a coupling extension 15 of the water conducting pipe in which is a shut off valve 16.

17 designates an expansion chamber attached to and in communication with the water conducting pipe 14. This chamber is closed throughout except for the communication with the pipe 14 and it may be of the semicircular form shown or any other suitable form. The said expansion chamber is preferably located above the molds as shown in the drawings.

In the practical use of my tire forming and vulcanizing apparatus for the treatment of tires composed of rubber compound and fabric, I proceed as follows:—The tires having been built up in the usual manner are placed in the molds B while the rubber compound is in the raw or uncured state, the abutment rings $b$ of the molds being positioned between the edges of the tires so that fluid tight joints at such edges are produced. When the abutment rings $b$ are put in place they contain the automatic air relief devices C having the check valve 13 which is normally open.

The number of filled molds it is desired to use in the apparatus are placed one upon another with the lowermost mold resting upon the ram head 6. The abutment spider 4 is then inserted into the vulcanizer pot above the molds and in engagement with the lugs 1ª, thereby locking said abutment spider in such manner as to cause it to constitute a stop above the molds. The ram 5 is then elevated and the molds become clamped between the ram head and the abutment spider 4. The water conducting pipe 14 is then attached to the abutment rings $b$ of the several molds B by fitting the connections 14ª to said abutment rings and the expansion chamber 17 being attached to said water conducting pipe the apparatus is in condition for delivery of hydraulic pressure into the tires within the molds.

A water delivery pipe (not shown) is attached to the coupling 15 of the water conducting pipe 14 and the shut-off valve 16 being open water is forced into the tires within the molds. As the water enters the tires the air therein escapes through the automatic valve devices C, it being understood that the vulcanizer pot is open at this time owing to the closure 3 being absent from the body of the pot. When the raw tires are first placed in the molds they do not completely fill the mold cavities owing to such cavities being larger than the raw tires as illustrated in Fig. IV. The pressure under which the water is introduced into the tires is preferably one of a degree sufficiently high to expand the tires to the walls of the mold cavities, although a pressure slightly less than this may be sufficient for the reason that the hydraulic pressure in the tires will be increased when the water is heated by the heating of the vulcanizer pot in the manner to be hereinafter explained. When water is introduced into the tires of the molds B a certain quantity of the water enters the expansion chamber 17, but inasmuch as this expansion chamber is a closed receptacle the air therein cannot escape from said chamber and is compressed due to the hydraulic pressure thereagainst.

The tires having been filled with water to subject them to a desired degree of hydraulic pressure the shut-off valve 16 is then closed and the water delivery pipe is disconnected from the conducting pipe extension 15. The closure 3 is then secured to the body of the vulcanizer pot and the apparatus is in condition for service in the vulcanization of the tires. Heat is applied to the vulcanizer pot to perform the vulcanization by creating a circulation of steam through said pot, the steam entering the pot through the steam inlet pipe 2 and escaping therefrom through the outlet pipe 2ᵃ. The steam in its circulation in the pot heats the molds B and the tires therein while said tires remain subjected to constant uniform hydraulic pressure. As the water in the tires and in the conducting pipe 14 leading thereto becomes heated it will naturally expand and become greater in volume. However, in view of the fact that the air in the expansion chamber is under pressure, the water will not be vaporized to produce steam but the increase in volume of water will be taken care of in the expansion chamber.

In the use of my vulcanizing apparatus I preferably introduce steam into the vulcanizing pot at a temperature of about 270° throughout the period of vulcanization of the tires in the molds B. The water is introduced into the tires at preferably about 150 pounds pressure, although this pressure may be greater or less as found desirable.

The expansion chamber, or air chamber 17, is preferably a non-yielding device, the air trapped in said chamber serving as a cushion that may be compressed in response to the expansion of the water.

I claim:—

1. In an apparatus for vulcanizing rubber articles, a mold, means for introducing water into said mold, means for heating the water in said mold, and a non-yielding expansion device associated with said mold to permit the expansion of water in the mold without permitting the generation of steam in the mold.

2. In an apparatus for vulcanizing rubber articles, a mold, means for introducing water into said mold, means for heating the water in said mold, and a non-yielding expansion device including an air chamber associated with said mold to permit the expansion of water in the mold without permitting the generation of steam in the mold.

3. In an apparatus for vulcanizing rubber articles, a mold, means for introducing water into said mold, means for heating the water in said mold, and a non-yielding expansion device including a closed air chamber having communication with the interior of said mold.

4. In an apparatus for vulcanizing rubber articles, a mold, means for introducing water into said mold, means for heating the water in said mold, and an expansion chamber above the plane of said mold having communication with the interior of the mold.

5. In an apparatus for vulcanizing rubber articles, a mold, means for introducing water into said mold, means for heating the water in said mold, and an expansion device including an air chamber located above the plane of the water in the mold and having communication with the interior of the mold.

6. In an apparatus for vulcanizing hollow rubber tires, a tire mold, means for introducing water into the tire confined in the mold, a venting device associated with said parts to allow the hollow tire to be filled with water, means for heating the water in the tire, and a non-yielding expansion device including an air chamber communicating with the interior of the mold to provide for the expansion of the water in the tire.

7. In an apparatus for vulcanizing hollow rubber tires, a tire mold, a conductor through which water may be introduced into the tire confined in said mold, a venting device associated with said parts to allow the tire to be filled with water, means for closing the water receiving elements to maintain the tire full of water during the vulcanizing operation, means for heating the water in the tire, and a non-yielding air chamber permitting the expansion of water in the tire.

NELSON W. McLEOD.